(12) United States Patent
Shrivastava et al.

(10) Patent No.: US 6,323,674 B1
(45) Date of Patent: Nov. 27, 2001

(54) TECHNIQUE AND APPARATUS FOR TERMINATING A TRANSMISSION LINE

(75) Inventors: Udbhava A. Shrivastava, Tempe; James T. Doyle; Edward J. Bawolek, both of Chandler, all of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/515,270

(22) Filed: Feb. 29, 2000

(51) Int. Cl.$^7$ ................................................ H03K 19/003
(52) U.S. Cl. ................................................ 326/30; 326/83
(58) Field of Search ........................ 326/30, 26, 101–103, 326/83, 86; 333/32, 17.3; 343/713, 860

(56) References Cited

U.S. PATENT DOCUMENTS

| | | | |
|---|---|---|---|
| 5,339,459 | * 8/1994 | Schiltz et al. | 455/333 |
| 5,686,872 | * 11/1997 | Fried et al. | 326/30 |
| 5,869,984 | * 2/1999 | Eto | 326/30 |
| 6,066,973 | * 5/2000 | Sekino et al. | 326/30 |
| 6,100,713 | * 8/2000 | Kalb et al. | 326/30 |

\* cited by examiner

*Primary Examiner*—Michael Tokar
*Assistant Examiner*—Don Phu Le
(74) *Attorney, Agent, or Firm*—Trop, Pruner & Hu, P.C.

(57) ABSTRACT

A system includes a transmission line, a driver, a load, a compensation capacitor and a compensation resistor. An output terminal of the driver is coupled to one end of the transmission line, and the load is coupled to the other end of the transmission line. The compensation capacitor is coupled in parallel with the output terminal of the driver, and the compensation resistor is coupled in series between the other end of the transmission line and the load.

11 Claims, 10 Drawing Sheets

TECHNIQUE AND APPARATUS FOR TERMINATING A TRANSMISSION LINE

BACKGROUND

The invention relates to a technique and apparatus for terminating a transmission line.

A matching impedance typically used to properly terminate a transmission line for purposes of transmitting high frequency signals over the line. As an example, a conductive circuit board trace is one such transmission line that may communicate a high frequency signal and thus, may need to be coupled to a matching impedance. Otherwise, without the matching impedance, the signal may be reflected at points along the trace where impedance mismatches are present.

For example, the conductive trace may form a data line of a memory bus of a computer system. Without proper termination of the conductive trace, excessive ringing and other types of distortion may severely affect the integrity of the signal leading to the erroneous indication of data by the signal. Furthermore, without proper termination, the signal may have substantial harmonic components, components that may cause excessive ringing in the signal and may cause the radiation of an excessive amount of electromagnetic interference (EMI) from the conductive trace.

There are several conventional techniques that may be used to terminate a transmission line. As an example, FIG. 1 depicts a parallel matching technique that may be used to terminate a transmission line 8. In this arrangement, a source 5 generates a signal that propagates across the transmission line 8 to a receiver 6 that may be represented from a loading perspective by a capacitor 9, for example. The source 5 is not ideal, but rather, the source 5 may be viewed as including an ideal signal generator 4 and having a nonideal resistance that is represented by a resistor 10 that is coupled in series with the signal generator 4. The source 5 may also have an inherent capacitance that is represented by a capacitor 11 that is coupled in between the output terminal of the source 5 and ground. To terminate the transmission line 8, the parallel matching technique teaches coupling a resistor 7 in parallel with the receiver 6.

Another transmission line termination technique is a source matching technique that is depicted in FIG. 2. In this technique, a resistor 16 is coupled between the source 5 and the transmission line 8 to terminate the transmission line 8. As shown, no matching impedance is coupled to the other end of the transmission line 8.

Unfortunately, matching techniques, such as the series and parallel matching techniques that are described above, may not work well when high capacitance loads are connected to different points of the transmission line. As a result, reflections and the resultant ringing may introduce long propagation, or flight times, across the transmission lines, especially when the transmission line communicates a digital signal that has predefined logic zero and logic one voltage levels.

Thus, there is a continuing need for a matching technique and arrangement that accommodates one or more of the problems that are stated above.

DETAILED DESCRIPTION

Figure 1:
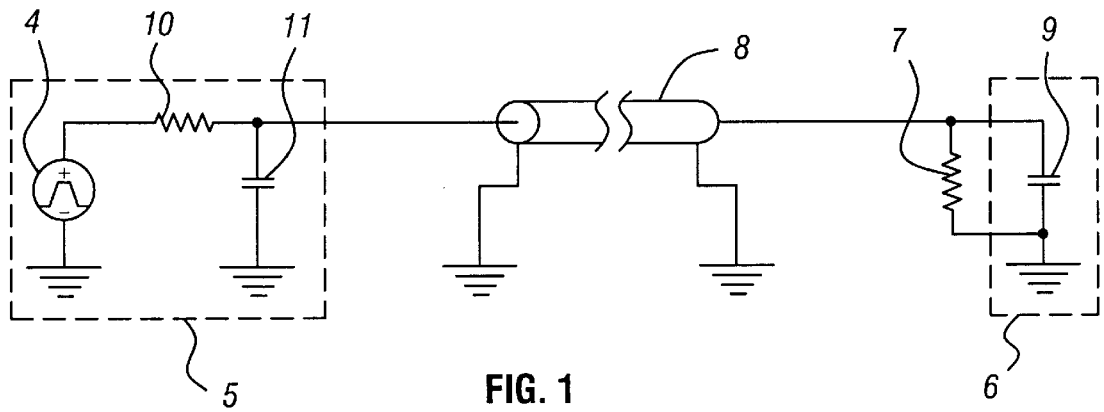
FIGS. 1 and 2 illustrate arrangements that use transmission line matching techniques according to the prior art.
Figure 2:
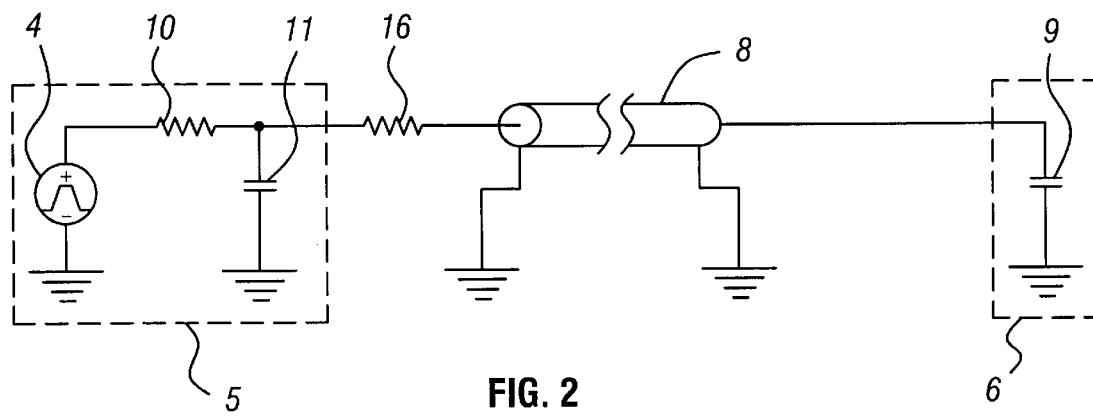
Figure 3:
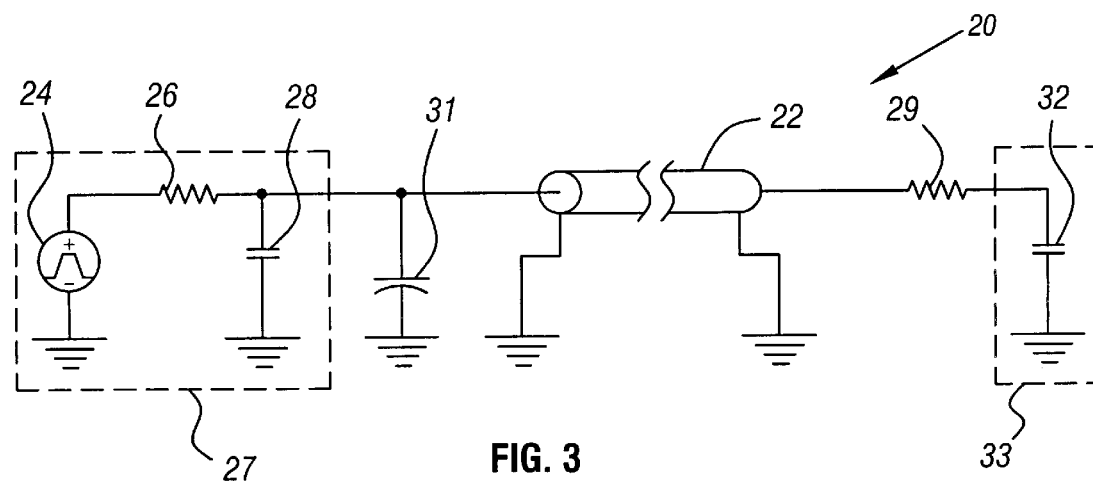
FIG. 3 is an illustration of an arrangement that illustrates transmission line matching according to an embodiment of the invention.

Referring to FIG. 3, an embodiment 20 of a transmission line system in accordance with the invention includes a transmission line 22 that communicates a signal between a source 27 and a receiver 33. For purposes of reducing any signal reflections that may be introduced by the transmission line 22, the transmission line 22 is terminated by a matching impedance that is split into two components: a capacitor 31 that is located near one end of the transmission line 22 and is coupled between the output terminal of the source 27 and ground; and a resistor 29 that is coupled in series between the other end of the transmission line 22 and the receiver 33.

More particularly, unlike conventional matching techniques, the capacitor 31 is deliberately coupled to the output terminal of the source 27. Such an arrangement is contrary to the teachings of conventional matching techniques, because it may be believed that adding additional capacitance to the output terminal of the source 27 increases the propagation time to the signal that is furnished by the source 27 and travels across the transmission line 22. However, it has been discovered that the addition of the capacitor 31 may improve the propagation time. More specifically, it has been discovered that the additional capacitance provides an impedance matching topology that provides better termination of the transmission line 8 than the termination that is provided by a conventional matching technique. As a result, the amount of ringing in the signal is reduced, thereby reducing its propagation time, as further illustrated below.

As depicted in FIG. 3, the capacitor 31 and the inherent capacitance (represented by a capacitor 28) of the source 27 contribute to the total capacitance that is present at the source's output terminal. Besides the capacitor 28, the source 27 may further be represented by an ideal signal generator 24 and a resistor 26 that is coupled between the output terminal of the signal generator 26 and the output terminal of the source 27. The resistor represents the inherent output resistance of the source 27. Thus, as shown, the capacitors 28 and 31 and the resistor 26 form a low pass filter.

Besides the capacitor 31, the other component of the matching impedance, the resistor 29, is coupled in series between the receiver 33 and the other end of the transmission line 22. As shown, the resistor 29 in combination with a capacitor 32 (that represents the input capacitance of the receiver 33) form a low pass filter. Thus, due to the splitting of the matching impedance, low pass filters are established at both ends of the transmission line 22. These low pass filters, in turn, reduce the amplitudes of fifth and higher harmonics in the signal that propagates across the transmission line 22 to reduce ringing in the signal, while keeping any delay penalty small.

As an example, in some embodiments of the invention, the source 27 may be a signal buffer, such as a complementary metal-oxide-semiconductor (CMOS) inverter, for example. As another example, the transmission line 22 may be a conductive printed circuit board trace, such as a data, address, clock or control line of a memory bus, for example.

The following technique may be used to derive the appropriate capacitance and resistance values for the capacitor 31 and the resistor 29, respectively, based on transmission line matching theory. For this exemplary design, the parasitic impedances (the parasitic impedances of the source 27, the transmission line 22, packaging, etc.) are computed at a principle rise time frequency, the approximate frequency of the third harmonic of a clocking frequency to which the signal that propagates across the transmission line 22 is synchronized. For example, if the signal that propagates across the transmission line 22 is a data signal, then this data signal is synchronized to a clock signal that has predefined frequency. For this example, the principle rise time frequency would be the third harmonic of the predefined clock frequency.

As a more specific example, in some embodiments of the invention, the combined capacitance (called $C_{TOT}$ below) of the capacitors 28 and 31 may be in a range that is described in Equation 1 below:

$$(T_{RISE})/(2.2 \cdot Z_0) < C_{TOT} < (T_{RISE})/(2.2 \cdot R_{SOURCE}), \quad \text{Eq. 1}$$

where "$T_{RISE}$" represents the principle rise time, and "$R_{SOURCE}$" represents the resistance of the resistor 26. From $C_{TOT}$, the capacitance (called "$C_{SOURCE}$" below) of the capacitor 31 may be determined, as described in Equation 2 below:

$$C_{SOURCE} = C_{TOT} - C_{PARA}, \quad \text{Eq. 2}$$

where "$C_{PARA}$" represents the capacitance of capacitor 28. Continuing the example, the resistance (called $R_{LOAD}$ below) of the resistor 29 may be in a range that is described in Equation 3 below:

$$(T_{RISE})/(2.2 \cdot C_{LOAD}) < R_{LOAD} < (Z_0 - R_{SOURCE}), \quad \text{Eq. 3}$$

where "$C_{LOAD}$" represents the capacitance of the capacitor 32. The total delay may be described by the following equation:

$$\text{Total delay penalty} = 0.06 \cdot T_{RISE} + R_{LOAD} \cdot C_{LOAD} \quad \text{Eq. 4}$$

The advantages of the above-described matching technique may include one or more of the following. The power in the third and higher harmonies of the signal that propagates across the transmission line 22 may be reduced by approximately 6 to 20 decibels (dB). The waveform of the signals at both ends of the transmission line 22 may be monotonic. The power consumption may be lower than the consumption that is achieved with a parallel matching technique and approximately equal to the consumption that is achieved with a series matching technique. Signal integrity at the source 27 may be improved, especially lower ringing in the signal at the source 27. The signal near the receiver 33 may have a lower harmonic content. Electromagnetic interference (EMI) may be reduced. The technique may provide the ability to match a wider range of transmission line topologies and capacitive loads. Other advantages may be possible.

The matching technique that is described above may be compared to conventional matching techniques in the simulations that are described below. For these simulations, the signals at the source and the receiver have a fundamental frequency component of about 133 megahertz (MHz); and the transmission line has a characteristic impedance of about 50 ohms. As an example, the transmission line may be a conductive trace that forms a data, control, address or clock line of a bus, such as a memory bus, for example.

Figure 4:
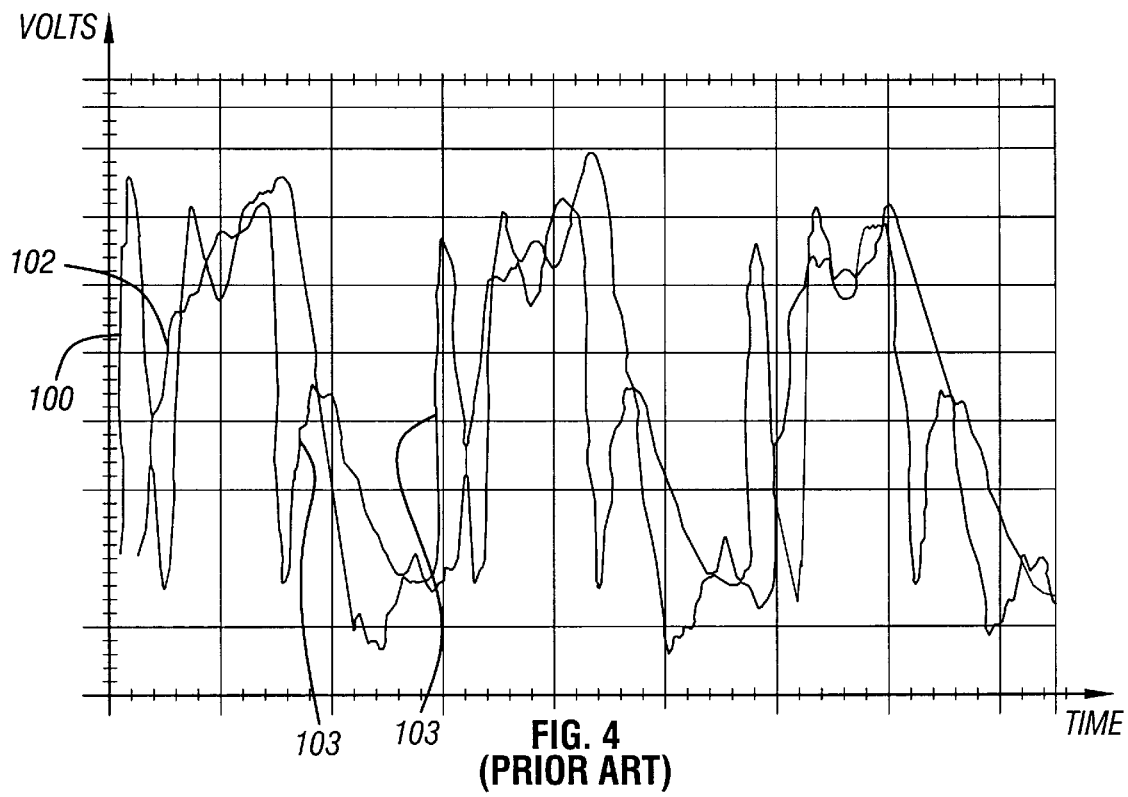
FIG. 4 illustrates waveforms that depict signals at both ends of a transmission line that is terminated pursuant to a parallel matching technique of the prior art.
Figure 5:
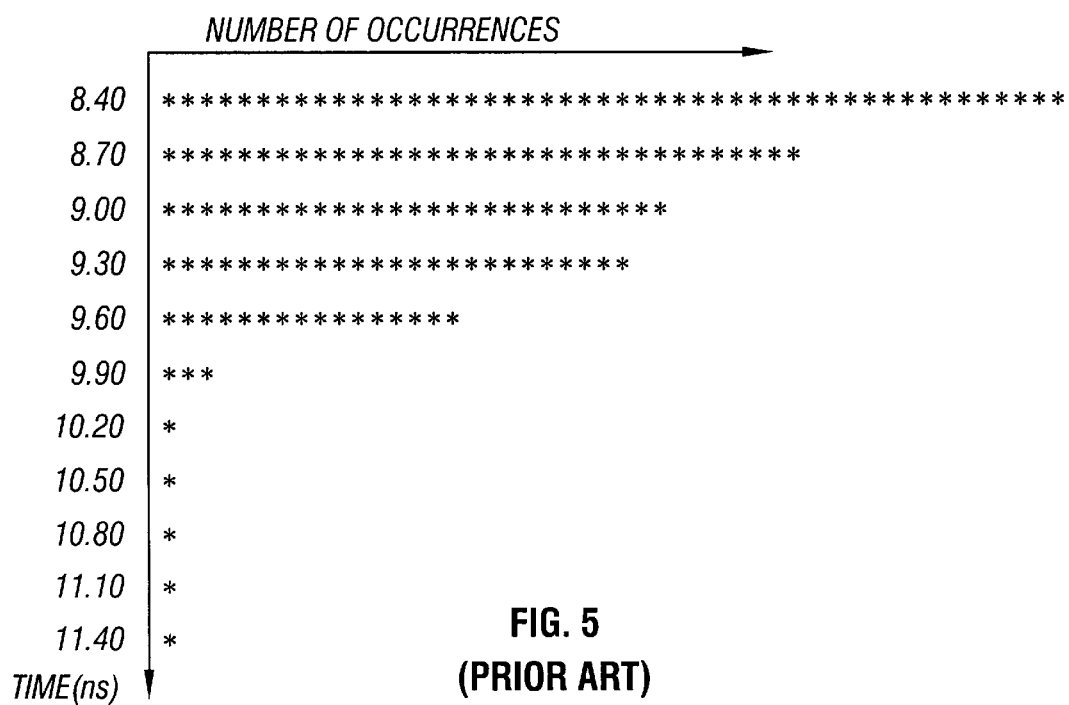
FIG. 5 is a histogram depicting signal flight times achieved using the parallel matching technique that is depicted in FIG. 4.

FIG. 4 depicts the results of one of these simulations in which a parallel matching technique is used to terminate a transmission line. The simulation produces two signals: a signal 100 at the source end of the transmission line and a signal 102 at the receiver end of the transmission line. As shown, the reflections that are introduced by the transmission line introduces substantial harmonic components to the signal 100 that cause ringing to appear in the signal 100 as depicted by the peaks 103. FIG. 5 depicts a histogram of propagation, or flight times, across the transmission line for different capacitive loads (different input capacitances of different receivers, for example). As shown, these simulations, most flight times were in the range of 8.40 to 9.60 nanoseconds (ns).

Figure 6:
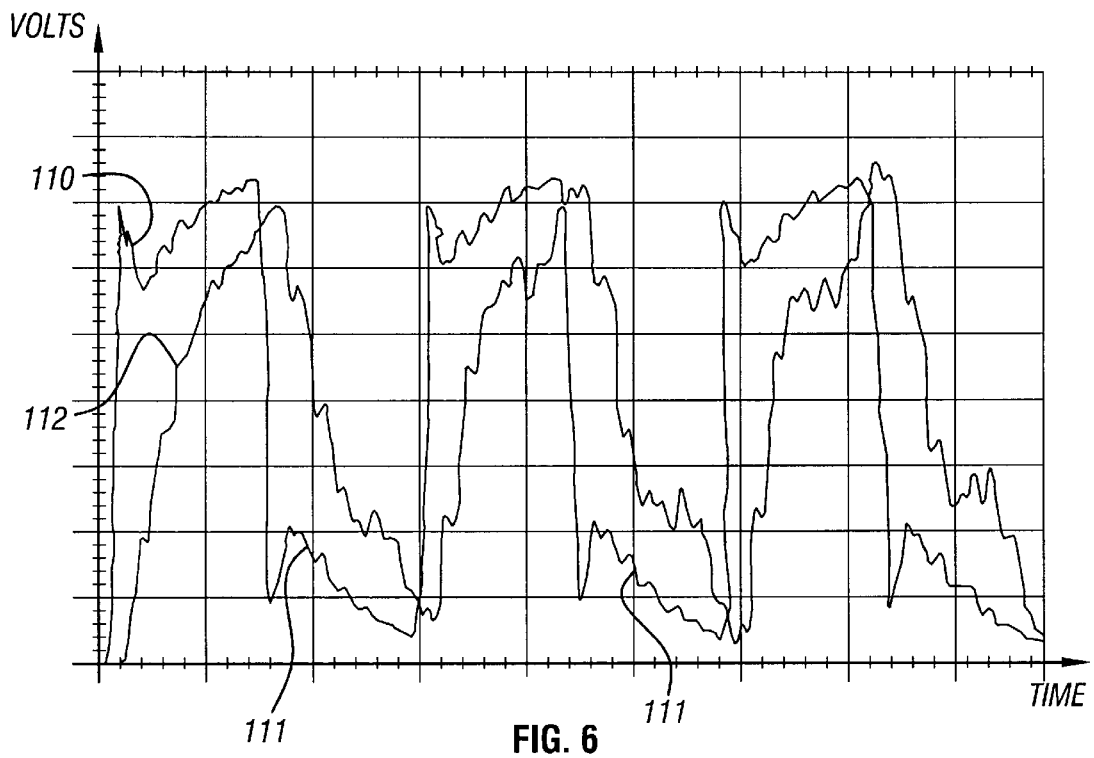
FIG. 6 illustrates waveforms depicting signals at both ends of a transmission line that is terminated pursuant to a series termination technique of the prior art.
Figure 7:
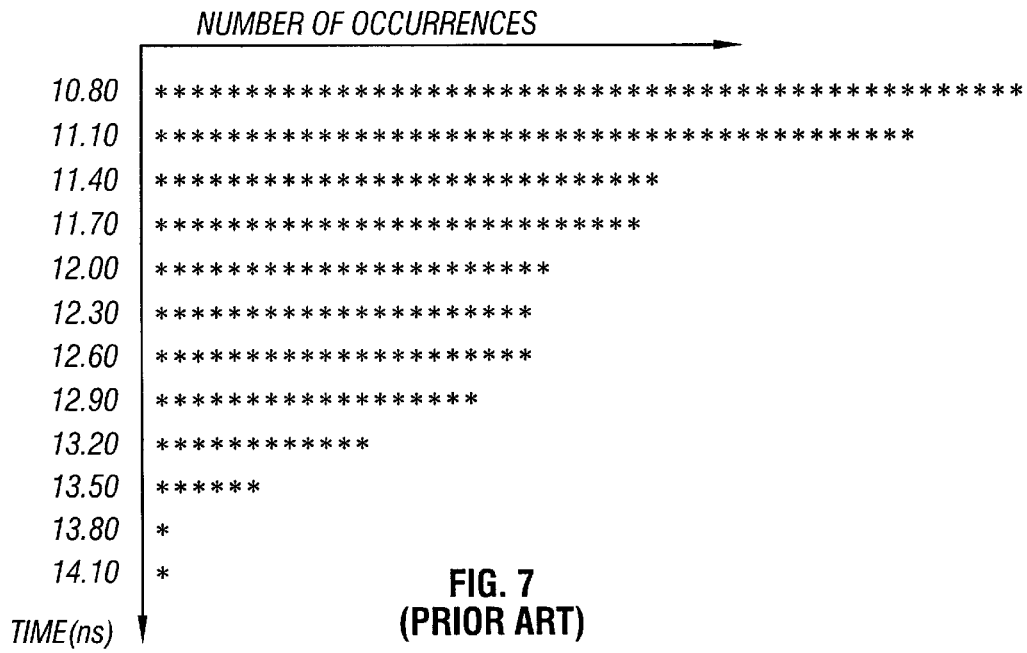
FIG. 7 is a histogram illustrating signal flight times for the series termination technique that is depicted in FIG. 6.

FIG. 6 depicts the results of one of these simulations in which a series matching technique was used to terminate the transmission line. The simulation produced two signals: a signal 110 at the source end of the transmission line and a signal 112 at the receiver end of the transmission line. As shown, the reflections that are introduced by the transmission line introduces substantial harmonic components to the signal 110 that cause ringing to appear in the signal 110 as depicted by the peaks 111. However, it is noted that the peaks 111 are not as large as the corresponding peaks 103 (see FIG. 5) when the parallel matching technique is used. FIG. 7 depicts a histogram of the flight times across the transmission line for different capacitive loads. For these simulations, most flight times were in the range of 10.8 to 13.5 ns, a range of times greater than the flight times that were achieved with the parallel matching technique.

Figure 8:
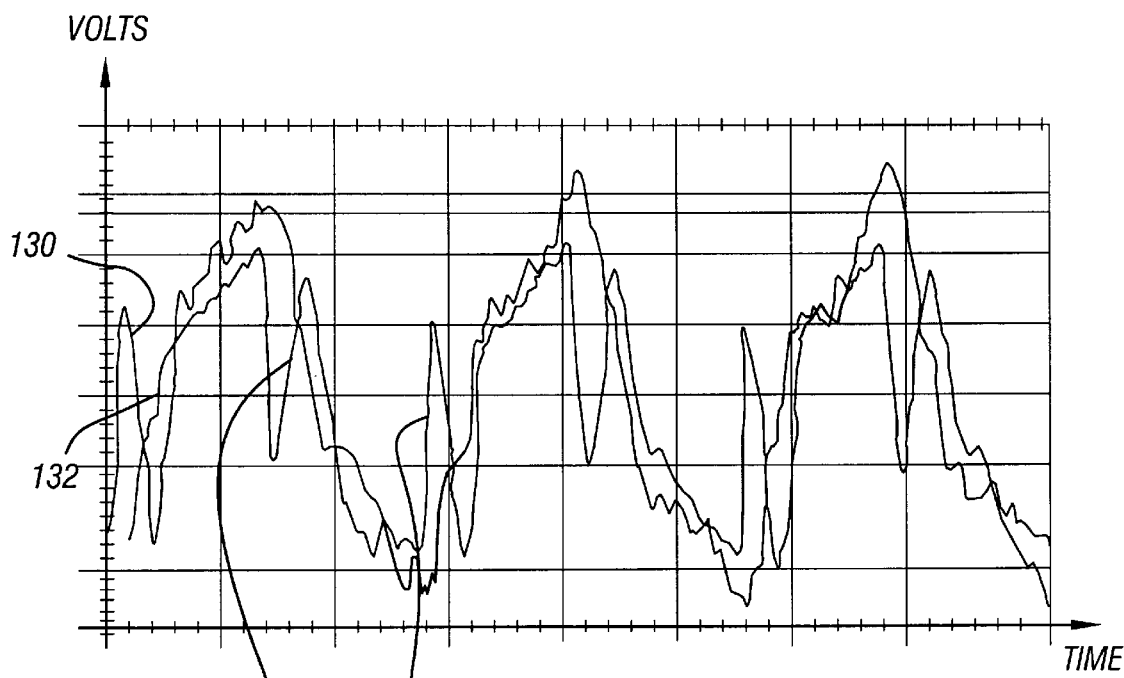
FIG. 8 illustrates waveforms on both ends of an unterminated transmission line.
Figure 9:
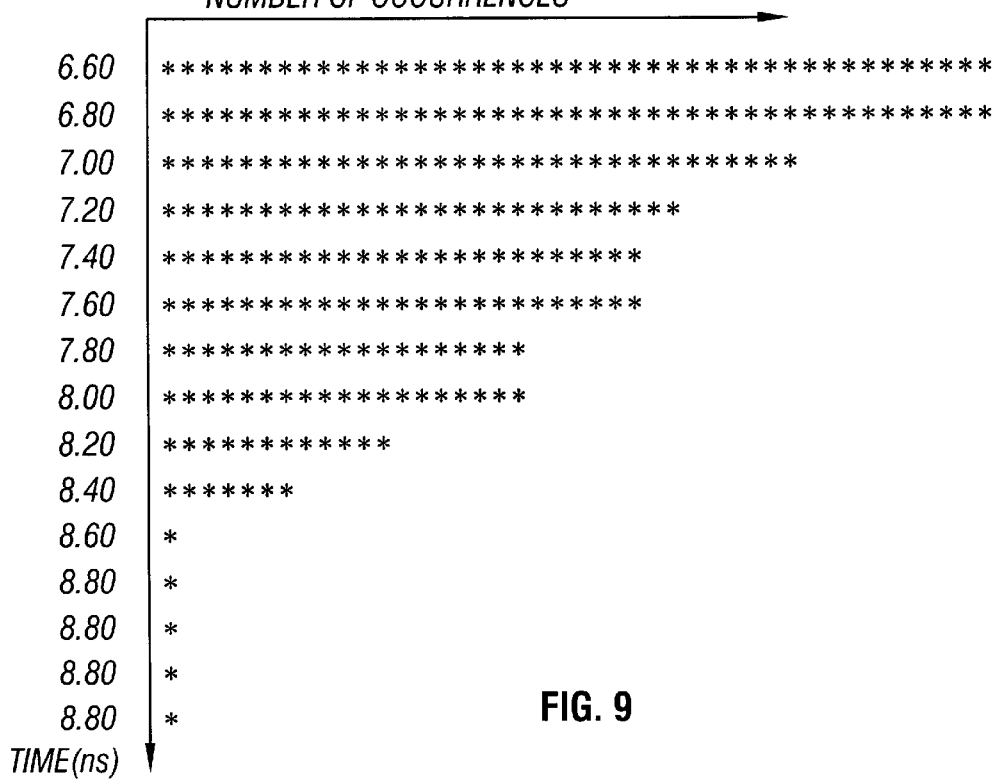
FIG. 9 is a histogram illustrating signal flight times across the unterminated transmission line of FIG. 8.

FIG. 8 depicts the results of one of these simulations in which no matching impedances were used to terminate the transmission line. The simulation produced two signals: a signal 130 at the source end of the transmission line and a signal 132 at the receiver end of the transmission line. As shown, the reflections that are introduced by the transmission line introduces substantial harmonic components to the signal 130 that cause ringing to appear in the signal 130 as depicted by the peaks 136. It is noted that the peaks 136 are larger than the peaks 103 or 111, as the signal 130 has larger harmonic components. FIG. 9 depicts a histogram of the flight times across the transmission line for different capacitive loads. For these simulations, most flight times were in the range of 6.6 to 8.4 ns.

Figure 10:
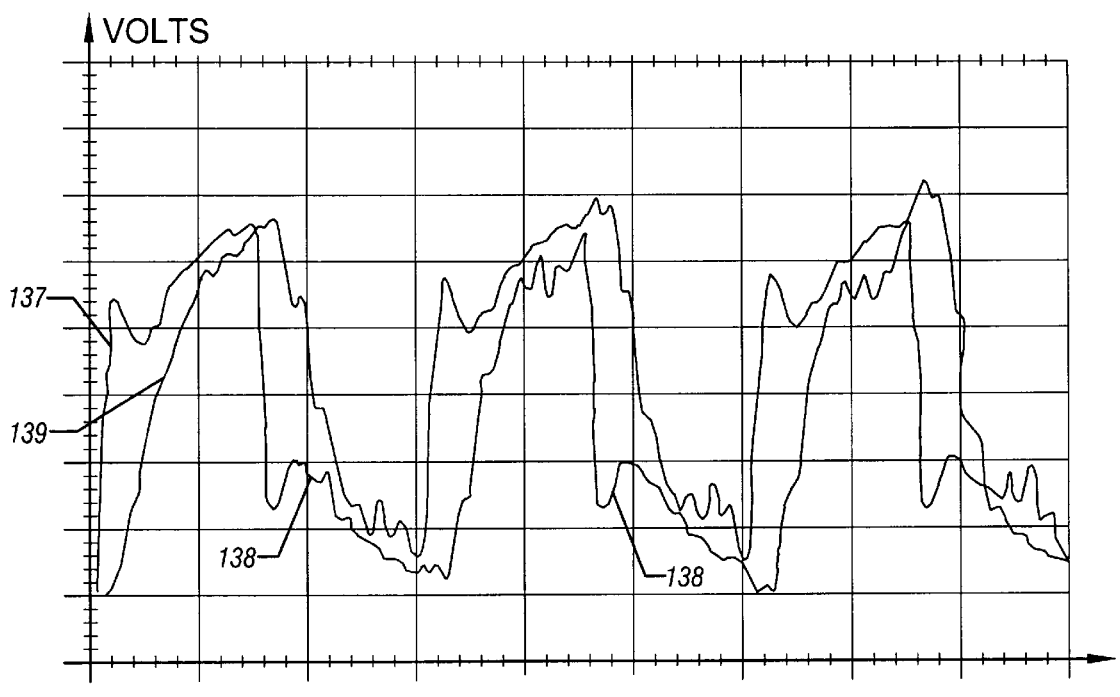
FIGS. 10, 12, 14 and 16 are waveforms depicting performance of the system of FIG. 3 according to different embodiments of the invention.
Figure 11:
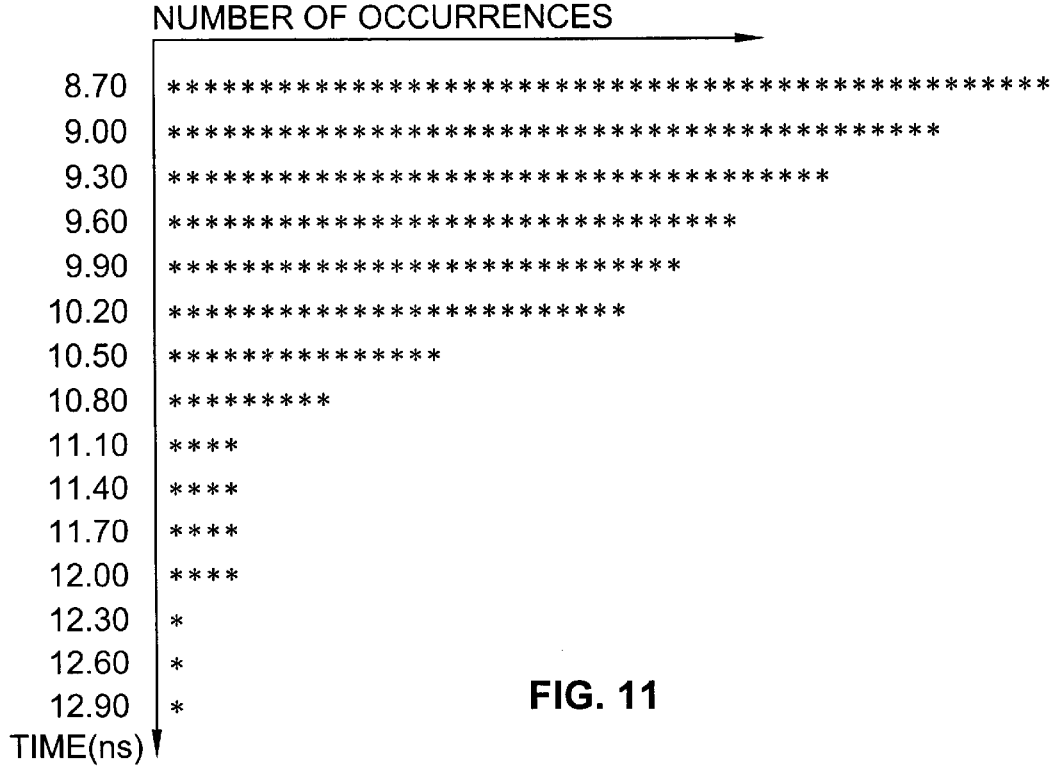
FIGS. 11, 13, 15 and 17 are histograms illustrating flight times of data across the transmission line of FIG. 3 according to different embodiments of the invention.

FIG. 10 depicts the results of one of these simulations in which a parallel matching capacitance was added (via the capacitor 31 (see FIG. 3)) to cause the total source capacitance (i.e., the combined capacitances of the capacitors 28 and 31) to be approximately 20 picofarads (pf), and the resistor 29 (see FIG. 3) had a resistance of approximately 20 ohms. The simulation produced two signals: a signal 137 at the source end of the transmission line and a signal 139 at the receiver end of the transmission line. As shown, the harmonic components of the signal 137 are substantially less than the source signals described above with no, series and parallel matching techniques that are described above. In this manner, the signal 130 has slight ringing (illustrated by the peaks 138), as compared to the ringing that is produced with the no, parallel and series matching techniques that are described above. FIG. 11 depicts a histogram of the flight times, across the transmission line for different capacitive loads. For these simulations, most flight times were in the range of 8.7 to 10.8 ns, the same approximate range of the flight times that were achieved with parallel termination, without the excessive ringing.

Figure 12:
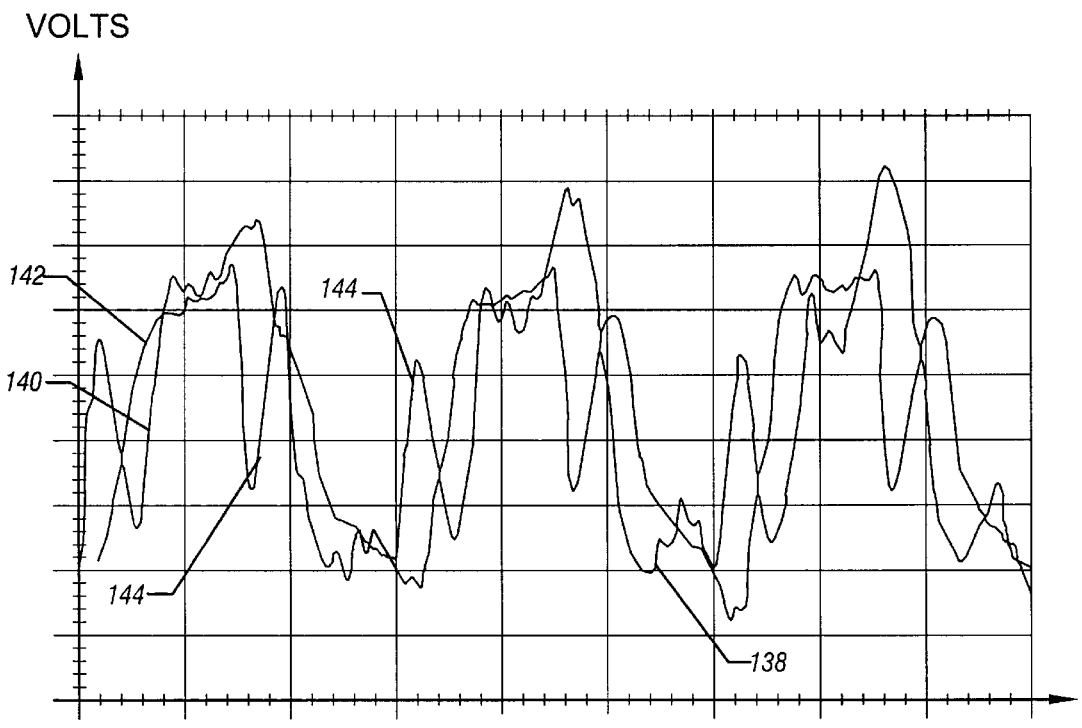
Figure 13:
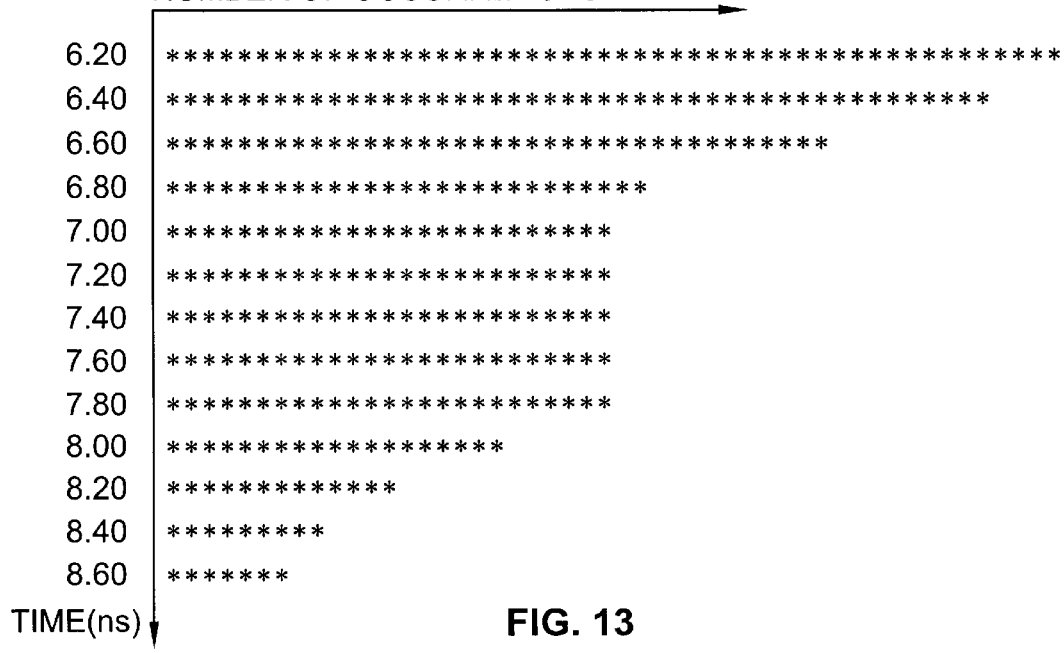

Other variations are possible. For example, in some embodiments of the invention, the series matching resistor 29 (see FIG. 3) may not be used. In this manner, only the matching capacitor 31 at the source is used for purposes of termination. Still assuming a characteristic load impedance of 50 ohms (as an example), the capacitance of the capacitor 31 may be selected so that the combined capacitances of the capacitors 28 and 31 is approximately 20 pf. FIG. 12 depicts the results of a simulation where the clocking frequency (to which the signal that propagates across the transmission line is synchronized) is 133 megahertz (MHz); and the transmission line has a characteristic impedance of about 50 ohms. For this simulation, the capacitance of the capacitor 31 was selected to cause the combined capacitances of the capacitors 28 and 31 to be approximately 20 pf. In this simulation, a signal 140 appears at the source end of the transmission line, and a signal 142 appears at the receiver end of the transmission line. As shown, the signal 140 has substantial harmonic components, as indicated by the ringing peaks 144. However, the ringing is less than the series or parallel termination techniques, resulting in flight times between approximately 6.2 to 8.6 ns (see FIG. 13). It is noted that these flight times that are substantially less than those achieved with conventional matching techniques 13.

Figure 14:
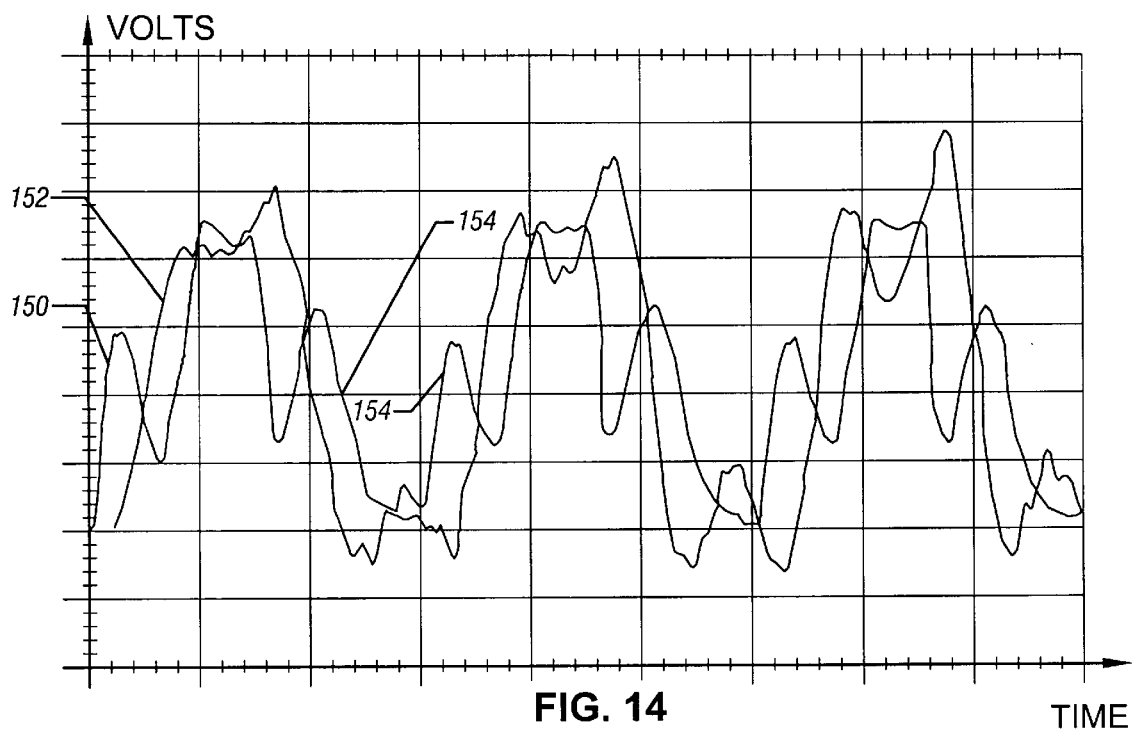
Figure 15:
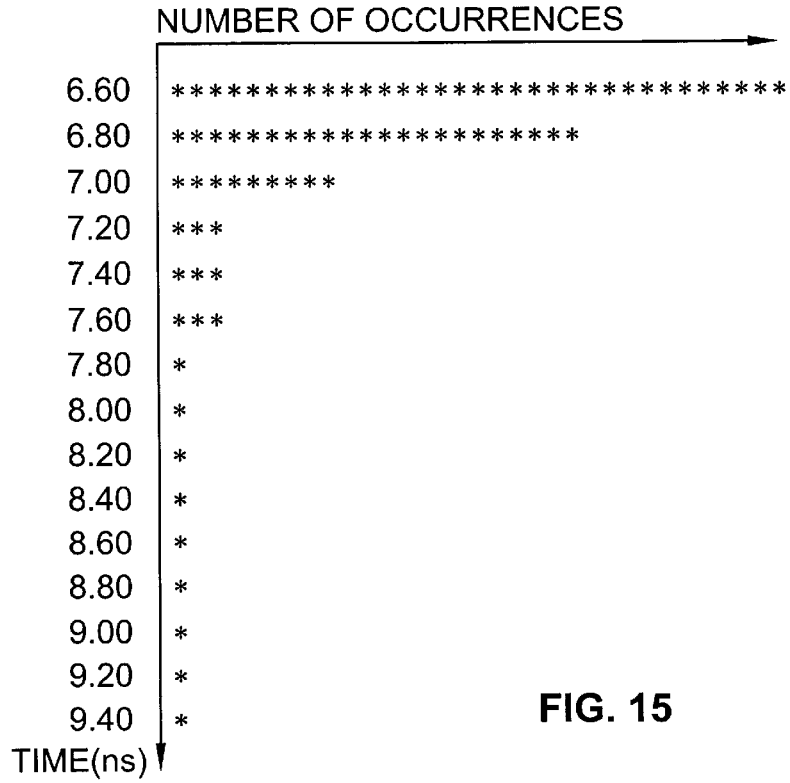
Figure 16:
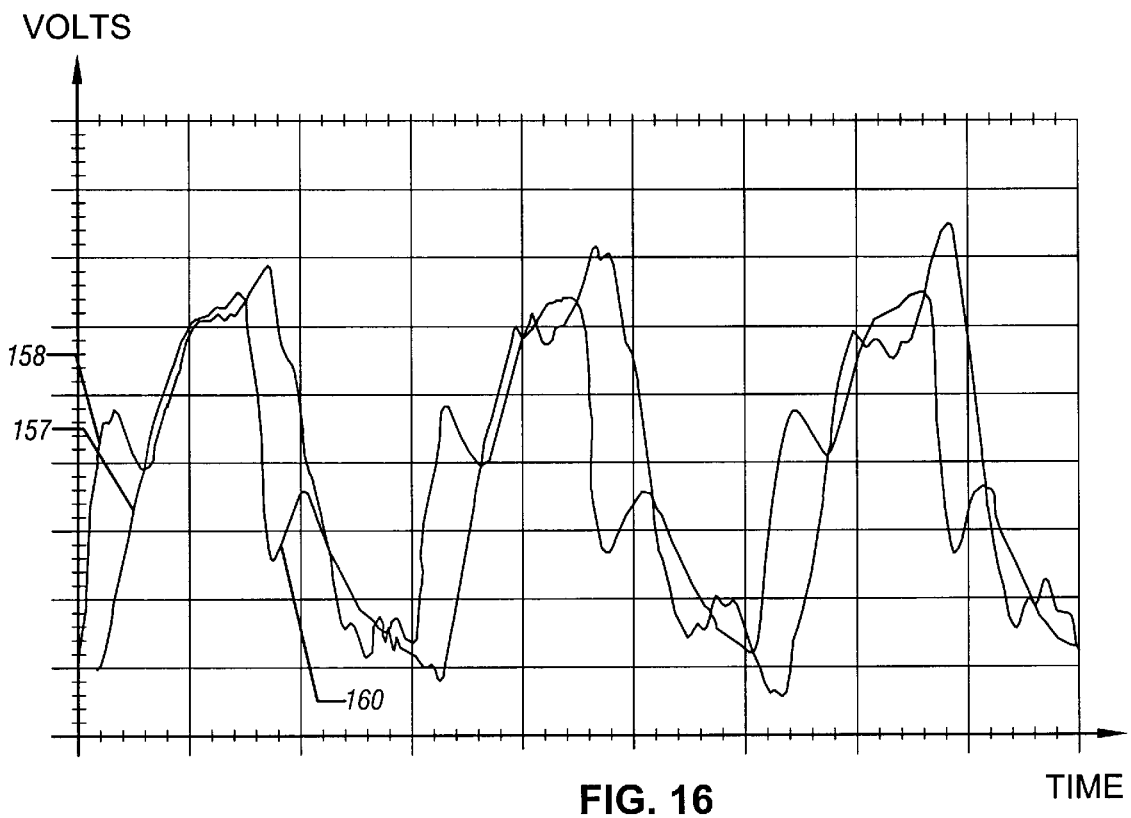
Figure 17:
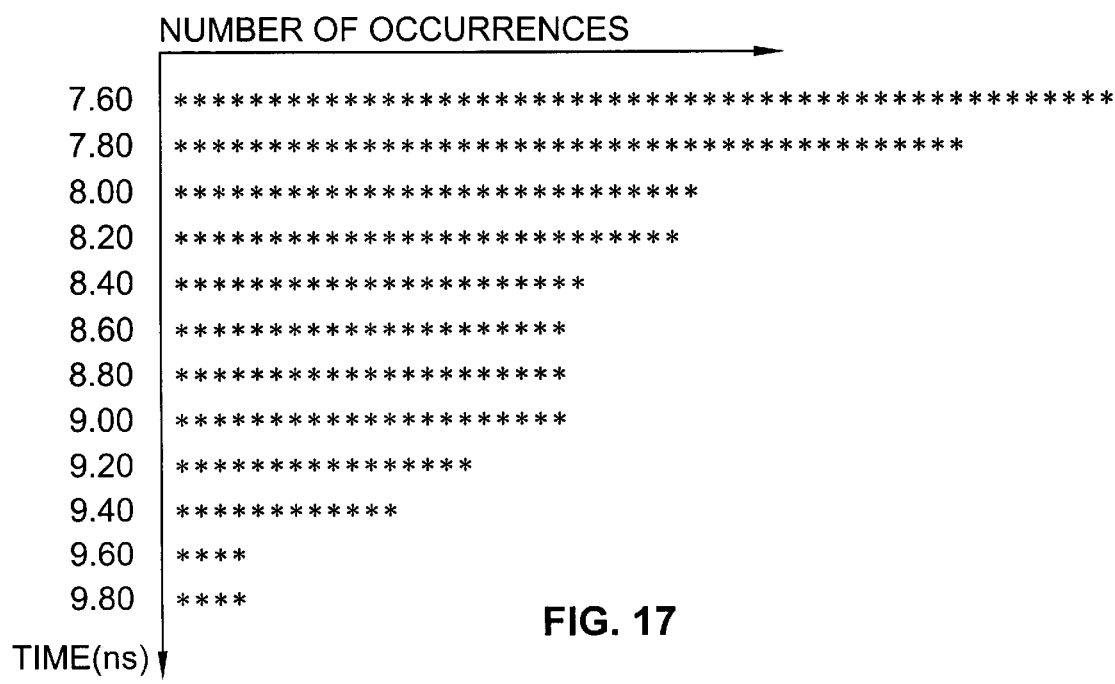

In a variation of the capacitor 31 and no resistor 29 technique that is described above, the combined capacitance of the capacitors 28 and 31 may be increased from 20 pf to 40 pf (still no series resistance being used) to produce source end 150 and receiver end 152 signals that are depicted in FIG. 14. The larger source capacitance produces less ringing in the signal 150 (as depicted by the smaller peaks 154), an advantage that produces flight times in the range of approximately 6.6 to 7.6 ns, as depicted in FIG. 15. In yet another variation, a resistance of 10 ohms for the resistor 29 may be used, leaving the combined capacitances of the capacitors 28 and 31 at 40 pf. For this variation, the source end 157 and receiver end 158 signals are produced, as depicted in FIG. 16. As shown, the additional of the small series load resistance reduces the peaks 160. As depicted in FIG. 17, the flight times for this arrangement vary between approximately 7.6 to 9.4 ns.

Figure 18:
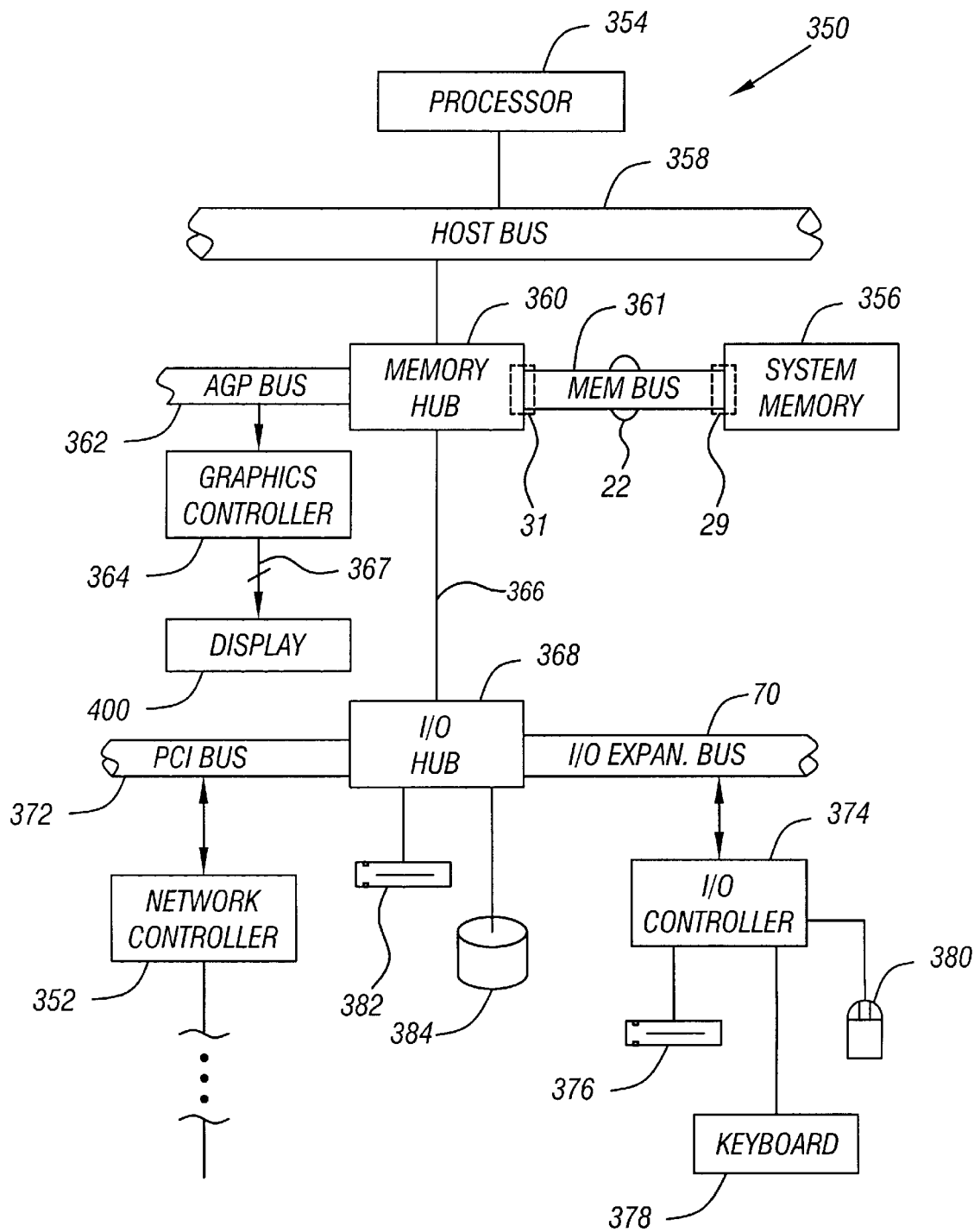
FIG. 18 is a schematic diagram of a computer system according to an embodiment of the invention.

Referring to FIG. 18, in some embodiments of the invention, the transmission lines 22 may be formed from conductive traces that form data, control, clock and address lines of a memory bus 361 of a computer system 350. In this manner, the capacitors 31 are located near one end of the bus 361 near a north bridge, or memory hub 360, and the resistors 29 are located near the other end of the bus 361 near a system memory 356.

Among the other features of the computer system 350, the computer system 350 may include a processor 354 that is coupled to a host bus 358. In this context, the term "processor" may generally refer to one or more central processing units (CPUs), microcontrollers or microprocessors (an X86 microprocessor, a Pentium® microprocessor or an Advanced RISC Machine (ARM)® microprocessor, as examples), as just a few examples. Furthermore, the phrase "computer system" may refer to any type of processor-based system that may include a desktop computer, a laptop computer, an appliance, a digital camera or a set-top box, as just a few examples. Thus, the invention is not intended to be limited to the illustrated computer system 350, but rather, the computer system 350 is an example of one of many possible embodiments of the invention.

The host bus 358 may be coupled by the memory hub 360 to an Accelerated Graphics Port (AGP) bus 362. The AGP is described in detail in the Accelerated Graphics Port Interface Specification, Revision 1.0, published in Jul. 31, 1996, by Intel Corporation of Santa Clara, Calif. The AGP bus 362 may be coupled to, for example, a graphics controller 364 that controls a display 400. The memory hub 360 may also couple the AGP bus 362 and the host bus 358 to the memory bus 361.

The memory hub 360 may also be coupled (via a hub link 366) to another bridge, or input/output (I/O) hub 368, that is coupled to an I/O expansion bus 370 and a bus 372. The bus 372 may be coupled to a network controller 352, for example. The I/O hub 368 may also be coupled to, as examples, a CD-ROM drive 382 and a hard disk drive 384. The I/O expansion bus 370 may be coupled to an I/O controller 374 that controls operation of a floppy disk drive 376 and receives input data from a keyboard 378 and a mouse 380, as examples. As an example, the bus 372 may be a Peripheral Component Interconnect (PCI) bus. The PCI Specification is available from the PCI Special Interest Group, Portland, Oreg. 97214.

Figure 19:
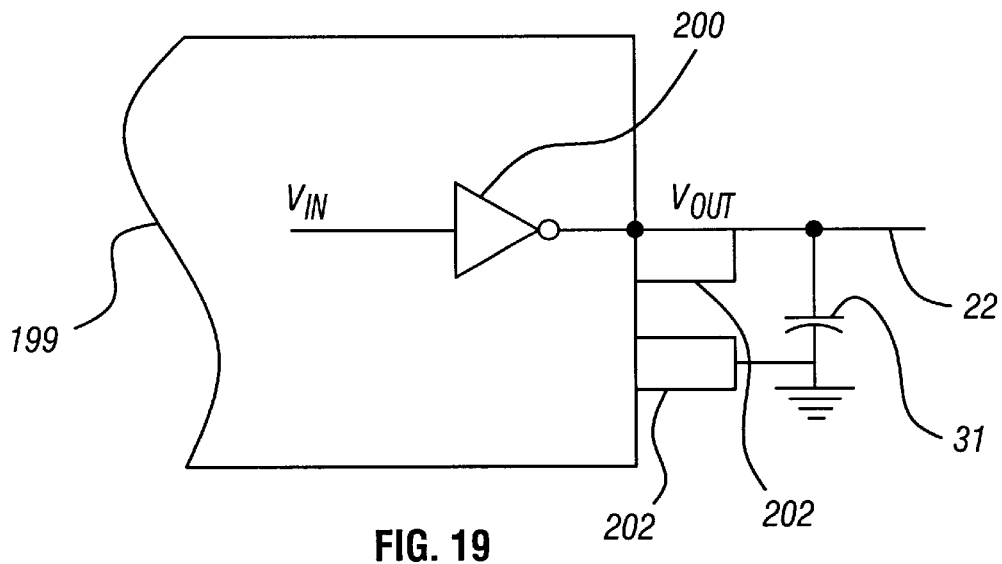
FIGS. 19, 20 and 21 illustrate different arrangements for coupling the matching capacitor to the transmission line according to different embodiments of the invention.

The capacitor 31 may be coupled to the end of the transmission line using one of many different techniques. For these techniques, it is assumed that the source 27 is an inverter 200 (see FIG. 19, for example), although other arrangements are possible. As an example of one technique to couple the capacitor 31 to the transmission line 22, the inverter 200 may be located in a semiconductor package 199, and the capacitor 31 may be coupled to an output pin 202 of the semiconductor package 199.

Figure 20:
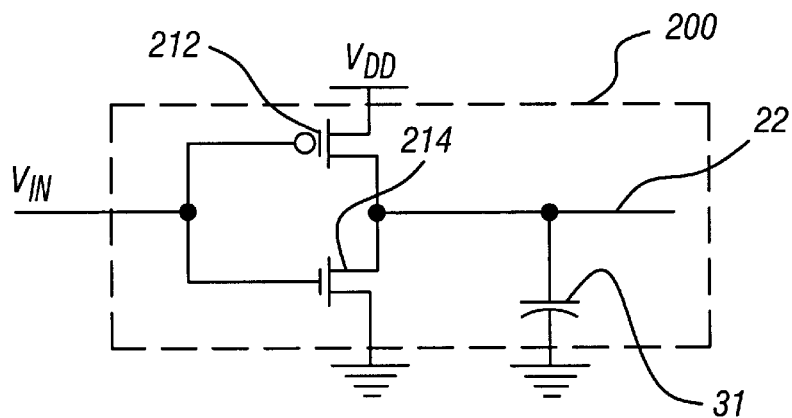

Referring to FIG. 20, in another embodiment of the invention, the capacitor 31 may be part of the inverter 200. In this manner, the inverter 200 may a complementary metal-oxide-semiconductor (CMOS) inverter that is formed from a p-channel metal-oxide-semiconductor field-effect-transistor (PMOSFET) 212 and an n-channel MOSFET (NMOSFET) 214. The capacitor 31 in this arrangement may be coupled between the drain and source terminals of the NMOSFET 214.

Figure 21:
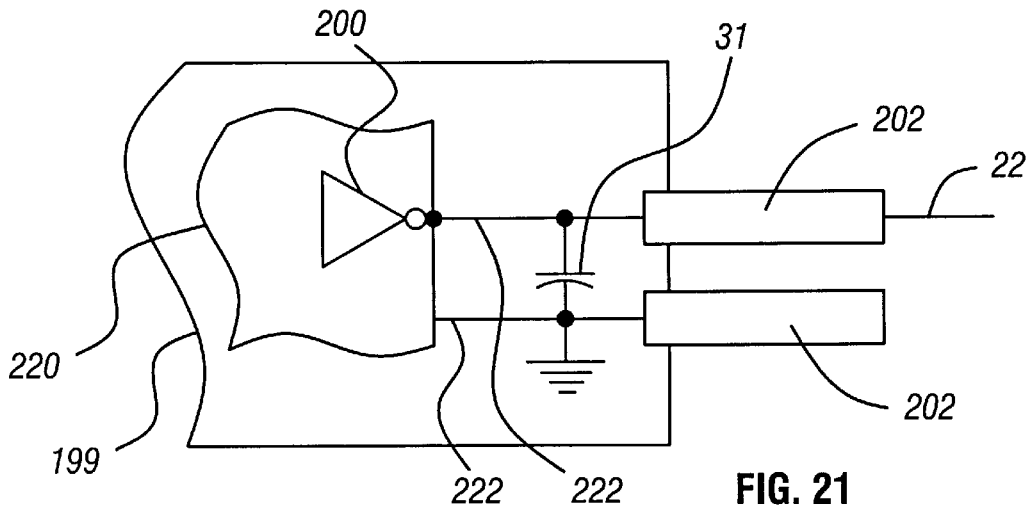

Referring to FIG. 21, in some embodiments of the invention, the inverter 200 may be formed on a semiconductor die 220 that is encased by the semiconductor package 199, and the capacitor 31 may be coupled to a conductive trace 222 that extends between the output terminal of the inverter 200 and one of the output pins 202 of the package 199. Other arrangements are possible.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:

coupling an output terminal of a driver to one end of a transmission line;

coupling a load to the other end of the transmission line; and coupling a capacitor in parallel with the output terminal to match an impedance of the line without using additional circuitry.

2. The method of claim 1, further comprising:

selecting a capacitance of the capacitor in view of another capacitance that is introduced by the driver.

3. The method of claim 1, wherein the driver is part of a semiconductor package, the method further comprising:

placing the capacitor outside of the package.

4. The method of claim 1, wherein the driver is part of a die that is encased by a semiconductor package, the method further comprising:

placing the capacitor off the die; and encasing the capacitor within the semiconductor package.

5. A system comprising:

a transmission line having two ends;

a driver coupled to one end of the transmission line;

a load coupled to the other end of the transmission line; and a compensation capacitor coupled in parallel with the driver and coupled to said one end of the transmission line to match an impedance of the transmission line without using additional circuitry coupled between the driver and said one end of the transmission line.

6. The system of claim 5, wherein the transmission line propagates a periodic signal having higher frequency harmonic components and the compensation capacitor reduces magnitudes of the higher frequency harmonic components.

7. The system of claim 5, wherein the transmission line propagates a periodic signal having harmonic frequency components and the compensation capacitor reduces magnitudes of the harmonic frequency components to reduce a level of electromagnetic interference emissions.

8. The system of claim 5, wherein the driver has a characteristic impedance that introduces a capacitance in addition to the capacitance that is introduced by the compensation capacitor.

9. The system of claim 5, wherein the capacitor is external to the driver.

10. The system of claim 5, wherein the driver is part of a semiconductor package and the capacitor is external to the package.

11. The system of claim 5, wherein the driver is part of a die that is encased by a semiconductor package and the capacitor is external to the die and encased by the semiconductor package.

* * * * *